3,189,648
PROCESS FOR PREPARING N,N-DIALKYL-N'-ARYLAMIDINES
Henry J. Gerjovich, Wilmington, Del., assignor to E. I. du Pont de Nemours and Company, Wilmington, Del., a corporation of Delaware
No Drawing. Filed Apr. 11, 1962, Ser. No. 186,640
2 Claims. (Cl. 260—564)

This invention relates to the preparation of trisubstituted amidines.

This application is a continuation-in-part of my co-pending application Serial No. 741,232, filed June 11, 1958, now abandoned, which is a continuation-in-part of my application Serial No. 566,757, filed February 21, 1956 (now abandoned) which in turn is a continuation-in-part of my joint application with Richard V. Lindsey, Serial No. 517,644, filed June 23, 1955 (now abandoned).

More specifically, this invention relates to a novel one-container process for the preparation of trisubstituted amidines represented by the formula:

1

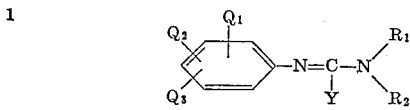

wherein:

$Q_1$ is selected from the group consisting of halogen, nitro and cyano;
$Q_2$ and $Q_3$ are selected from the group consisting of hydrogen, halogen and methyl;
Y is selected from the group consisting of hydrogen and methyl;
$R_1$ and $R_2$ can be the same or different and are each selected from the group consisting of methyl and ethyl; and when $R_1$ and $R_2$ are joined they become the divalent radical pentamethylene, tetramethylene or oxy-diethylene; and when $R_2$ and Y are joined they become the divalent radical trimethylene or tetramethylene.

The trisubstituted amidines in this invention are prepared by the reaction at atmospheric pressure and at slightly elevated temperatures of about 60 to 190° C. with an anhydrous aryl isocyanate having the formula:

2

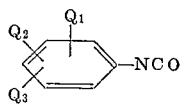

wherein:

$Q_1$, $Q_2$ and $Q_3$ have the same significance as in Formula 1, with an N,N-disubstituted amide of the formula

3

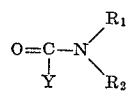

wherein:

Y, $R_1$ and $R_2$ taken separately or together have the same significance as in Formula 1.

This reaction can be illustrated as below by the reaction of 3,4-dichlorophenylisocyanate with dimethylformamide. The reaction produces N-(3,4-dichlorophenyl)-N',N'-dimethylformamidine.

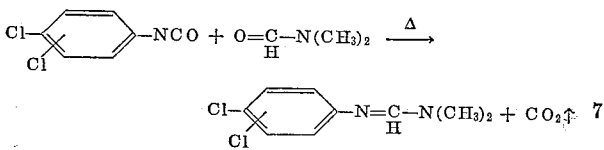

The reaction of an aryl isocyanate of Formula 2 with an N,N-disubstituted amide of Formula 3 is preferably effected by heating the aryl compound in an excess amount of the amide at a temperature of from 70° to 180° C. under atmospheric pressure until carbon dioxide no longer evolves from the mixture.

It is essential that the two reactants are interacted under anhydrous conditions. Traces of moisture will interact with isocyanates to form the corresponding urea compound as illustrated by the following series of equations wherein the Q's have the same significance as in Formula 1:

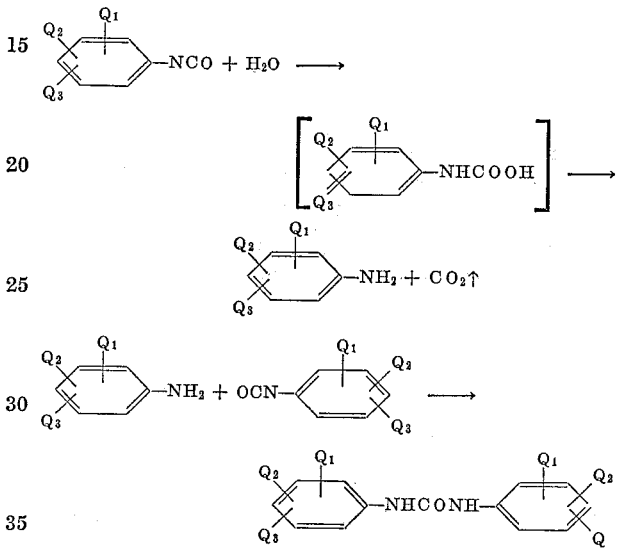

It is preferred to use an excess of the given N,N-disubstituted amide reactant to avoid the formation of undesirable by-products, namely, the dimer and trimer of the reactant isocyanate. The following tabulation of data illustrates the importance of reacting the aryl isocyanate under dilute conditions with respect to the amide so that the isocyanate cannot react with itself. The result is economically practical yields of the desired trisubstituted amidines.

TABLE I

| Run No. | Moles of amide | Solvent | Percent $CO_2$ evolved | Percent yield amidine | Percent Yield of isocyanate dimer and trimer |
|---|---|---|---|---|---|
| 1 | 1.0 | Toluene | 5.0 | | 93.0 |
| 2 | 1.0 | None | 30.0 | 27.7 | 62.0 |
| 3 | 2.0 | do | 64.0 | 48.9 | 38.3 |
| 4 | 4.0 | do | 79.0 | 70.0 | Trace |
| 5 | 5.0 | do | 95.0 | 90.0 | |

One mole of the phenylisocyanate is used in all the reactions tabulated above. The reactions in Table I are heated at reflux temperature until carbon dioxide ceases to evolve. In Run #1, essentially pure phenylisocyanate trimer (M.P. 285° C.) crystallized out of the toluene solvent.

In Runs 2 through 5, unreacted dimethylformamide is recovered by distillation under convenient reduced pressure. Continued distillation gives pure N-phenyl-N',N'-dimethyl-formamidine and the remaining pot residue when triturated with ether, gives dimer and trimer of phenylisocyanate.

The trisubstituted amidines are alkaline and are generally clear distillable liquids or low melting solids slightly soluble in water but very soluble in such solvents as ether, benzene and chloroform.

The compounds of the invention are useful as herbicides, especially against Johnsongrass at a dosage of about 10 pounds per acre; and as corrosion inhibitors for acid solutions on metal. They can also be employed as addition agents in electroplating; for instance, they can be added to cadmium or zinc cyanide baths at the limit of their solubility to produce desirable deposits.

In order that the invention may be better understood, the following specific illustrative examples are given in addition to those already above indicated. Unless otherwise indicated, parts are by weight.

*Example 1*

N-(p-chlorophenyl)-N',N'-dimethylformamidine)

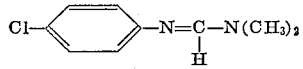

Fifteen and four-tenth parts of p-chlorophenyl-isocyanate and 36.5 parts of anhydrous dimethylformamide are combined, mixed and heated gradually until a steady stream of carbon dioxide gas evolves from the reaction mixture. Heating of the reaction mixture is continued so that the temperature of the amide-isocyanate mixture is maintained at or slightly below its reflux temperature until carbon dioxide ceases to evolve from the reaction mixture. The excess amide reactant is then removed from reaction mixture by distillation under reduced pressure. The distilled pot residue is extracted with ether. The ether is removed from the extract by evaporation to give a 99% yield of ether-free product consisting of N-(p-chloro-phenyl)-N',N'-dimethylformamidine.

*Analysis.*—Calc'd as $C_9H_{11}ClN_2$: N, 15.34; Cl, 19.45. Found: N, 15.05; Cl, 19.51.

*Example 2*

A solution of 1 part anhydrous dimethylformamide and 1 part p-chlorophenylisocyanate is added gradually with stirring to 1 part of dimethylformamide maintained at reflux temperature. The carbon dioxide evolution is thus simple to lead off and its rate of evolution is easy to control. The entire reaction mixture is maintained at reflux until carbon dioxide is no longer evolved. At this point the reaction is distilled to remove the excess dimethylformamide. Essentially pure N-p-chlorophenyl-N',N'-dimethylformamidine remains as the pot residue, and distillation of this residue under convenient reduced pressure gives pure product in over 90% yield.

*Examples 3 through 21*

The procedure of Example 1 is used to prepare the amidines listed in column 4 of Table II. In columns 2 and 3 of Table II are listed the reactants and the amount of each employed. All temperatures are degrees centigrade.

TABLE II

| Example No. | Isocyanate and parts by weight used | Amide and parts by weight used | Trisubstituted amidine obtained, and empirical formula | B.P. or M.P. | Analysis Calculated N | Analysis Calculated Cl | Analysis Found N | Analysis Found Cl |
|---|---|---|---|---|---|---|---|---|
| 3 | m-Chlorophenylisocyanate (15.4). | Dimethylformamide (36.5). | N-(m-chlorophenyl)-N',N'-dimethylformamidine (60% yield) $C_9H_{11}ClN_2$. | 102–103°/.22 mm | 15.34 | 19.45 | 15.26 / 15.20 | 20.06 / 20.08 |
| 4 | o-Chlorophenylisocyanate (15.4). | ___do___ | N-(o-chlorophenyl)-N',N'-dimethylformamidine (58% yield) $C_9H_{11}ClN_2$. | 99–102°/.25 mm | 15.34 | 19.45 | 15.34 / 15.16 | 19.40 / 19.47 |
| 5 | 3,4-dichlorophenylisocyanate (18.8). | ___do___ | N-(3,4-dichlorophenyl)-N',N'-dimethylformamidine (60% yield) $C_9H_{10}Cl_2N_2$. | 133–135°/.25 mm | 12.91 | 32.2 | 12.79 / 12.79 | 32.69 |
| 6 | m-Chlorophenylisocyanate (15.4). | N,N-dimethylacetamide (43.0). | N-(m-chlorophenyl)-N',N'-dimethylacetamidine (54% yield) $C_{10}H_{13}ClN_2$. | 96–97°/.28 mm | 14.25 | 18.08 | 13.87 | 18.42 / 18.34 |
| 7 | 3,4-dichlorophenylisocyanate (18.8). | ___do___ | N-(3,4-dichlorophenyl)-N',N'-dimethylacetamidine (36% yield) $C_{10}H_{12}N_2Cl_2$. |  | 12.10 | 30.8 | 11.98 / 12.26 | 31.25 |
| 8 | ___do___ | N,N-diethylformamide (50.5). | N-(3,4-dichlorophenyl)-N',N'-diethylformamidine (90% yield) $C_{11}H_{14}Cl_2N_2$. | 130–132°/.15 mm | 11.42 | 28.97 | 11.52 / 11.40 | 28.85 / 28.60 |
| 9 | ___do___ | N,N-diethylacetamide (57.5). | N-(3,4-dichlorophenyl)-N',N'-diethylacetamidine (46% yield) $C_{12}H_{16}Cl_2N_2$. | 140–143°/.5 mm | 10.81 | 27.41 | 10.73 | 27.83 / 27.91 |
| 10 | 3,5-dichloro-4-methylphenylisocyanate (20.2). | Dimethylformamide (36.5). | N-(3,5-dichloro-4-methylphenyl)-N',N'-dimethylformamidine $C_{10}H_{12}Cl_2N_2$. |  |  |  |  |  |
| 11 | p-Nitrophenylisocyanate (16.4). | N-formylmorpholine (57.5). | 4-(p-nitrophenylimino-methyl)morpholine (77% yield) $C_{11}H_{13}N_3O_3$. | 112.5–114° | 17.87 |  | 17.79 / 17.56 |  |
| 12 | o-Nitrophenylisocyanate (16.4). | Dimethylformamide (36.5). | N-(o-nitrophenyl)-N',N'-dimethylformamidine (75% yield) $C_9H_{11}N_3O_2$. | 152–154°/1.0 mm | 21.77 |  | 21.85 / 22.06 |  |
| 13 | m-Nitrophenylisocyanate 16.4). | ___do___ | N-(m-nitrophenyl)-N',N'-dimethylformamidine (32% yield) $C_9H_{11}N_3O_2$. | 58.5–59.5° | 21.77 |  | 20.73 / 20.93 |  |
| 14 | 4,5-dichloro-2-nitrophenylisocyanate (23.0) | ___do___ | N-(4,5-dichloro-2-nitrophenyl)-N',N'-dimethylformamidine (48% yield) $C_9H_9Cl_2N_3O_2$. | 126.5–127.5° | 16.03 | 27.09 | 15.55 / 15.36 | 26.78 / 26.79 |
| 15 | 2,4,6-trichlorophenylisocyanate (22.2). | ___do___ | N-(2,4,6-trichlorophenyl)-N',N'-dimethylformamidine (75% yield) $C_9H_9Cl_3N_2$. | 73–73.5° | 11.14 | 42.34 | 11.04 | 41.77 |
| 16 | 3,4-dichlorophenylisocyanate (18.8). | N-acetylmorpholine (64.5). | 4-[1-(3,4-dichlorophenylimino)ethyl]morpholine (43% yield) $C_{12}H_{14}Cl_2N_2O$. |  | 10.25 | 26.00 | 9.72 / 9.94 | 26.92 / 26.72 |
| 17 | ___do___ | N-methylpyrrolidone (49.5). | 2-(3,4-dichlorophenylimino)-1-methylpyrrolidine (55% yield) $C_{11}H_{12}Cl_2N_2$. |  | 11.52 | 29.21 | 11.10 / 11.22 | 29.02 / 28.61 |
| 18 | ___do___ | N-formylmorpholine (57.5). | 4-[(3,4-dichlorophenylimino)methyl]morpholine (68% yield) $C_{11}H_8Cl_2N_2O$. | 164–166°/.4 mm | 10.98 | 27.84 | 10.91 / 11.08 | 27.34 |
| 19 | o-Chlorophenylisocyanate (15.4). | ___do___ | 4-[(o-chlorophenylimino) methyl]morpholine (58% yield) $C_{11}H_9ClN_2O$. | 139–142°/.04 mm | 12.69 | 16.09 | 12.65 / 12.75 | 15.63 |
| 20 | ___do___ | N-acetylmorpholine (64.5). | 4-[1-(o-chlorophenylimino) ethyl]morpholine (57% yield) $C_{12}H_{11}ClN_2O$. | 138–142°/0.3 mm | 11.94 | 15.13 | 12.12 / 12.29 | 15.65 |
| 21 | 3,4-dichlorophenylisocyanate (18.8). | N-methylpiperidone (56.5). | 2-(3,4-dichlorophenylimino)-1-methylpiperidine. |  |  |  |  |  |

The invention claimed is:

1. The process which comprises mixing under anhydrous conditions at atmospheric pressure at a temperature within the range from about 70° to 180° C. a compound of the formula:

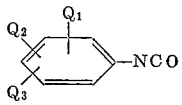

with from 1 to 10 molar parts as much of a compound of the formula:

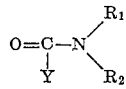

to produce a compound of the formula:

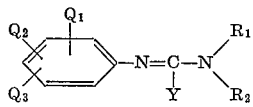

wherein:

$Q_1$ is selected from the group consisting of hydrogen, chlorine and nitro;

$Q_2$ and $Q_3$ are each separately selected from the group consisting of hydrogen, chlorine and methyl;

Y taken separately is selected from the group consisting of hydrogen and methyl;

$R_1$ and $R_2$ taken separately are each selected from the group consisting of methyl and ethyl;

and when $R_1$ and $R_2$ are joined they are together selected from the group consisting of pentamethylene, tetramethylene and oxydiethylene; and when $R_2$ and Y are joined they are together selected from the group consisting of trimethylene and tetramethylene.

2. The process which comprises mixing under anhydrous conditions at atmospheric pressure at a temperature within the range of 70° to 180° C. one part by weight of p-chlorophenylisocyanate and 2 parts by weight of dimethylformamide to form N-p-chlorophenyl-N',N'-dimethylformamidine.

References Cited by the Examiner

Bredereck et al.: Ber. Deut. Chem., vol. 92, pp. 837–849 (1959).
Knott et al.: J. Org. Chem., vol. 14, pp. 879–885 (1949).
Kuhn: Ber. Deut. Chem., vol. 18, pp. 1476–1479 (1885).
Roberts et al.: J.A.C.S., vol. 73, pp. 2277–2281 (1951).
Weiner: J. Org. Chem., vol. 25, pp. 245–6 (1960).
Wiley: J.A.C.S., vol. 71, pp. 3746–3748 (1949).

CHARLES B. PARKER, *Primary Examiner.*

L. ZITVER, *Examiner.*